Feb. 25, 1947. E. A. NORDBERG 2,416,540
METHOD OF WINDING ELECTRICAL CAPACITORS
Filed July 20, 1943 5 Sheets-Sheet 1

Inventor
Ernst A. Nordberg
by Roberts, Cushman & Woodberry
att'ys.

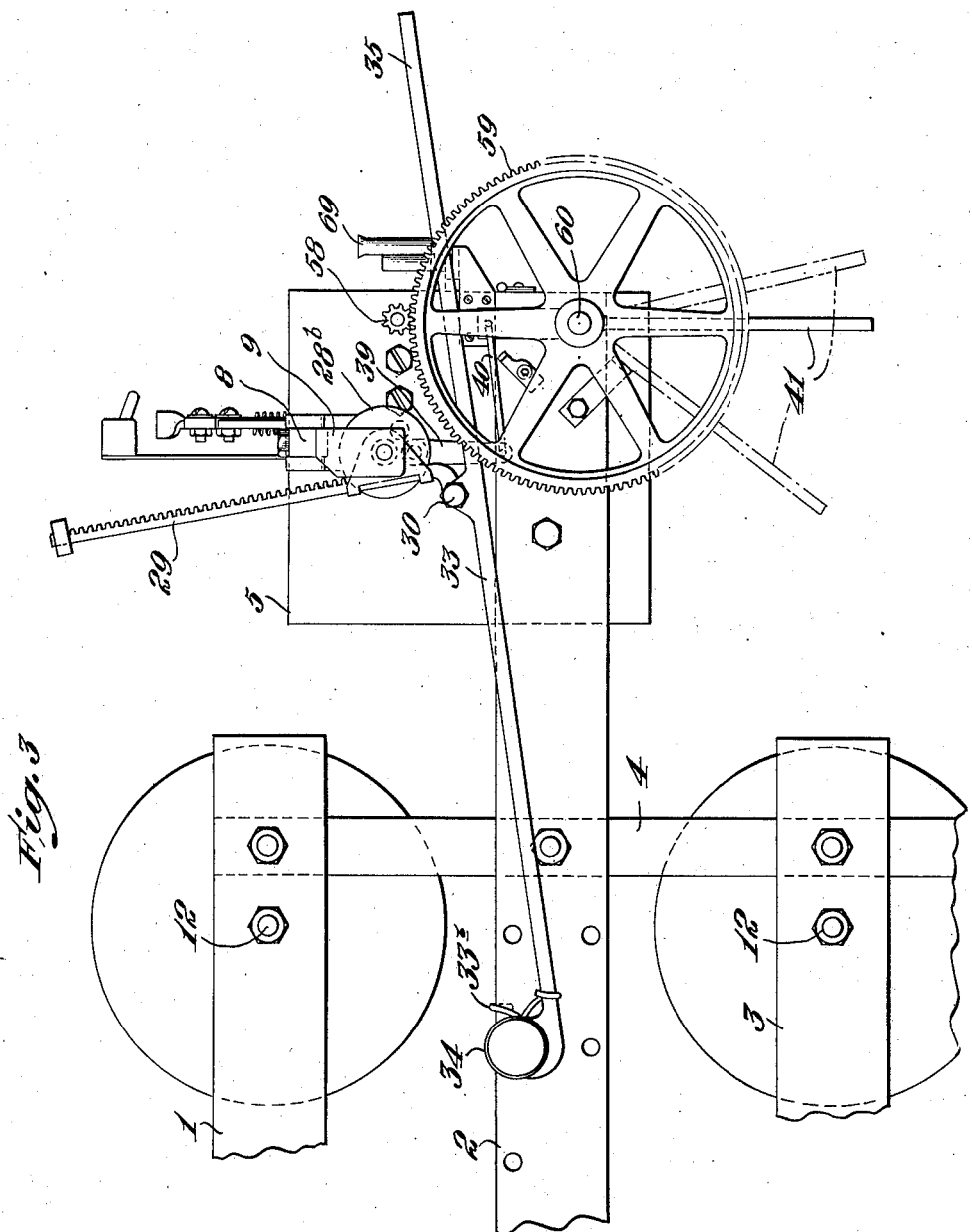

Feb. 25, 1947. E. A. NORDBERG 2,416,540
METHOD OF WINDING ELECTRICAL CAPACITORS
Filed July 20, 1943 5 Sheets-Sheet 4

Inventor
Ernst A. Nordberg
by Roberts Cushman & Woodberry
att'ys.

Feb. 25, 1947. E. A. NORDBERG 2,416,540
METHOD OF WINDING ELECTRICAL CAPACITORS
Filed July 20, 1943 5 Sheets-Sheet 5
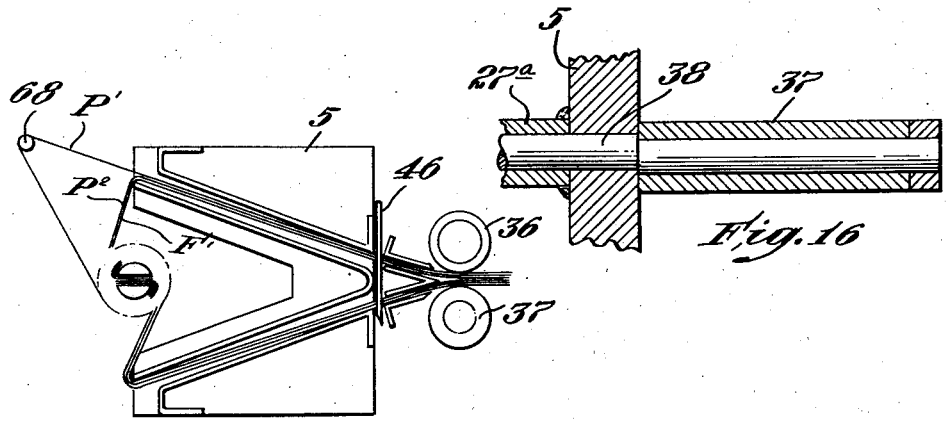
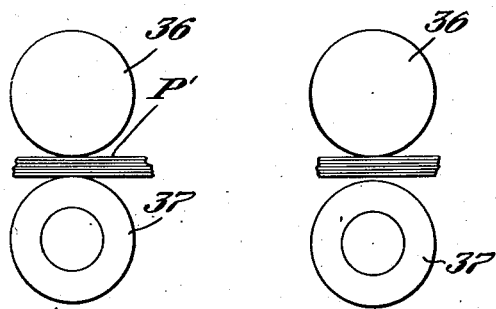
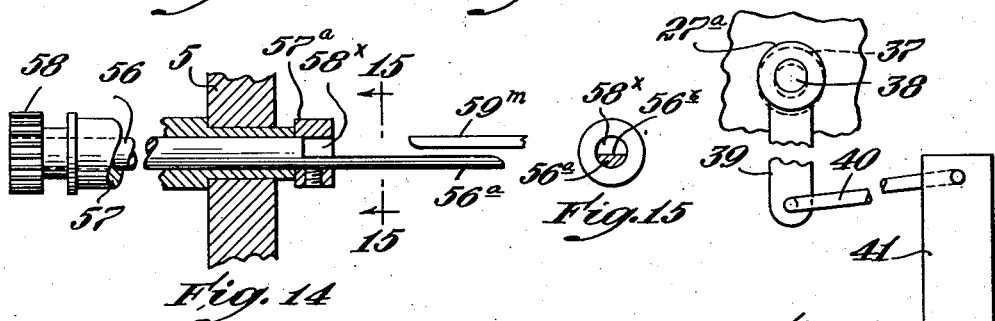
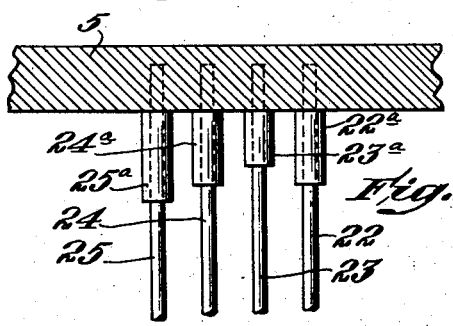
Inventor
Ernst A. Nordberg Patented Feb. 25, 1947

2,416,540

UNITED STATES PATENT OFFICE 2,416,540

METHOD OF WINDING ELECTRICAL CAPACITORS

Ernst A. Nordberg, Norwood, Mass., assignor, by mesne assignments, to Tobe Deutschmann, Canton, Mass.

Application July 20, 1943, Serial No. 495,466

2 Claims. (Cl. 242—56)

This invention pertains to the manufacture of electrical capacitors especially to capacitors which comprise coils of metal foil separated by a thin layer or layers of a dielectric material, and relates more particularly to a novel method of winding such capacitors.

Capacitors of this type are commonly made by drawing off two lengths of thin metal foil ribbon from supply rolls while at the same time drawing off one or more lengths of thin paper or other flexible dielectric material from similar supply rolls and winding the foil and paper simultaneously on a mandrel in such a way that the convolutions of metal foil are always separated by at least one layer of paper. In thus winding the foil and paper it is necessary that the final convolution of paper overlap the ends of the metal foil in order to provide a complete seal for the metal and also that the two strips of metal foil terminate at points spaced circumferentially of the coil so as to insure against short circuiting. It is preferable to employ a plurality of thin paper strips rather than a single thicker strip since the thin paper is more flexible and makes a firmer and more compact coil than a single thick layer. Furthermore the employment of a plurality of thin layers avoids short circuiting such as might result from the occurrence of pin holes or other defects in one layer. Heretofore in winding coils of this type it has been customary for the operator, after a sufficient length of foil has been wound, to stop the winding operation temporarily, sever the several strips of material, turn back the ends of the outer paper wrappings so as to expose the metal, cut off the two lengths of metal foil at the proper points and then continue the winding with the projecting end portion of paper alone so that the paper may properly overlap the metal. This procedure involves a substantial waste of the metal foil which is a matter of real importance at the present time when metal foil is so expensive and difficult to obtain. Moreover the described operations involved in the removal of such portions of the metal foil slow down production very substantially.

The principal object of the present invention is to provide a novel method of winding such capacitors whereby the waste of metal foil is completely eliminated and whereby the operation is facilitated and speeded up, for winding capacitors of either the inductive or non-inductive type at high speed and whether they comprise one or a plurality of paper wrappings. A further object of the present invention is to provide a winding method which facilitates the severance of the metal foil prior to the completion of the winding operation and before the end portions of the foil have been wound about the winding mandrel, and in such a way that the two strips of metal foil terminate at substantially diametrically opposite sides of the coil while the paper extends well beyond the metal foil to form an effective seal. A further object is to provide a winding method capable of winding very thin and delicate foil together with the thin paper with a minimum amount of breakage and loss. Other and further objects and advantages of the invention will be pointed out hereinafter in the following more detailed description and by reference to the accompanying drawings wherein Fig. 1 is a fragmentary diagrammatic right-hand side elevation illustrating one form of apparatus embodying the invention;

Fig. 3 is a fragmentary diagrammatic elevation of the left-hand side of the machine;

Fig. 8 is a diagrammatic end elevation showing the relative position of the feed rolls during the actual winding operation;

Fig. 12 is a view similar to Fig. 8 showing the feed rolls in the position which they occupy just prior to the cutting operation;

Fig. 13 is a diagrammatic side elevation, to larger scale, illustrating the means for moving the lower feed roll toward and from the upper roll;

Fig. 14 is a fragmentary plan view of the winding mandrel, certain parts being in section;

Fig. 15 is a vertical section on the line 15—15 of Fig. 14;

Fig. 16 is a fragmentary diametrical section through the shaft of the lower feed roll;

Fig. 17 is a fragmentary plan view of strip-guiding means;

Fig. 19 is a view similar to Fig. 7 but indicating the completion of the winding operation.

Figure 1:
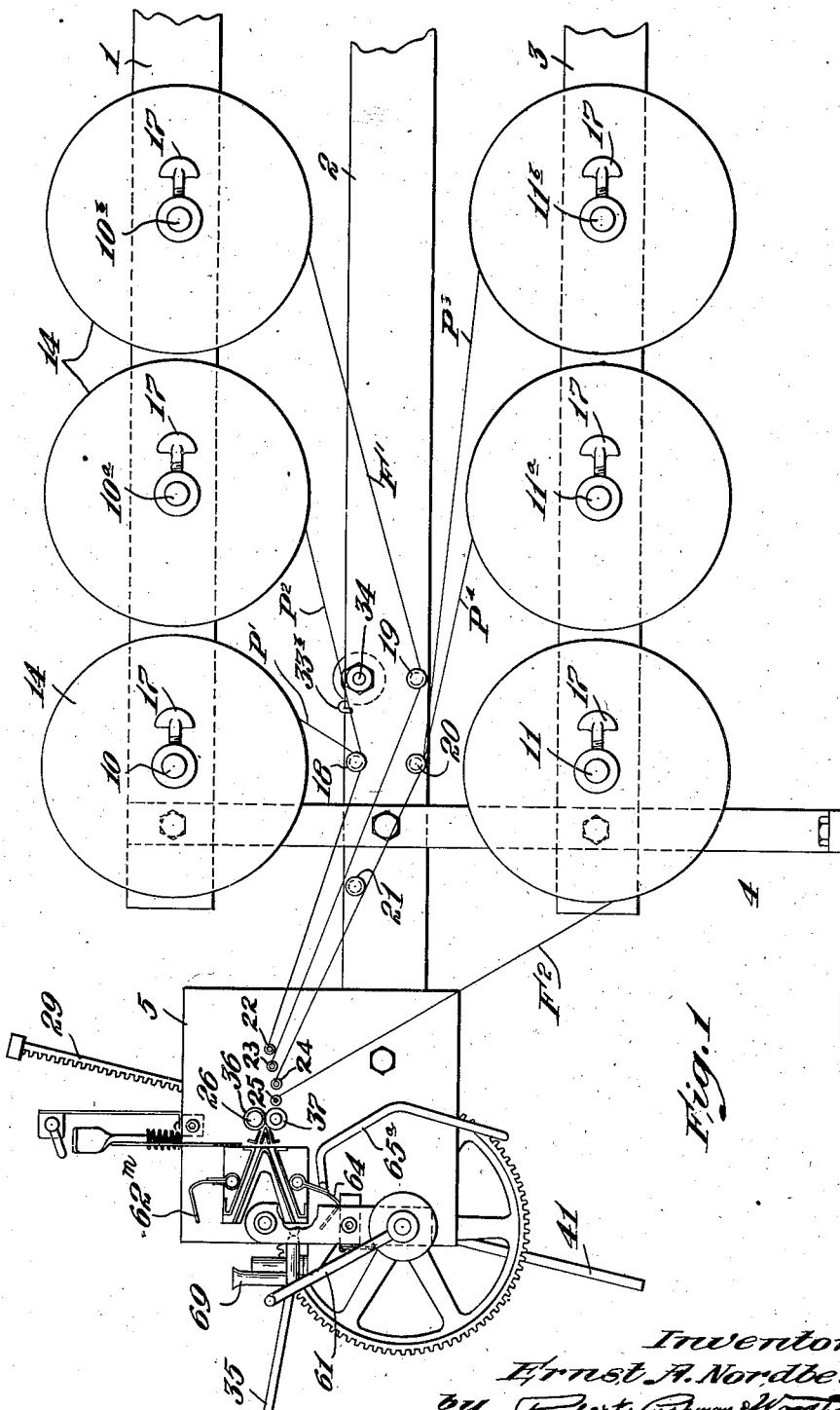

Referring to the drawings, more especially to Fig. 1, the frame of the machine is shown as comprising the substantially parallel, horizontal, rigid rails 1, 2 and 3 which are supported by uprights 4 (but one being shown) designed to be mounted upon any suitable support, for example a bench or the like. The middle rail 2 projects forwardly beyond the rails 1 and 3 and carries a vertically disposed plate 5 of substantial thickness and of rigid material which supports much of the operative mechanism of the machine. From the right-hand side of this plate 5 (Fig. 2) there projects a rigid, substantially horizontal, transverse bar 6 which supports a secondary vertical plate or frame member 7 parallel to and spaced from the plate 5. Projecting from the left-hand side of the plate 5 (Fig. 2) is another horizontal bar 8 supporting at its outer end another vertical frame member or block 9 parallel to but spaced from the member 5.

Mounted on the upper rail 1 is a series of stub shafts 10, 10$^a$ and 10$^b$ which are securely held in rigid, horizontal position by means of nuts 12 (Fig. 3) which unite them to the rail 1. In a similar way the rail 3 supports a lower series of stub shafts 11, 11$^a$ and 11$^b$. Each of these stub shafts carries a collar 13 (Fig. 2) just at the right-hand side of the corresponding rail and on each of the shafts to the right of the collar 3 is mounted a reel 14 having spaced flanges 14$^a$ and 14$^b$. These reels are designed to hold supply rolls of paper and metal foil and are removable when empty from their respective stub shafts for replacement with full reels. Preferably a coiled spring 15 embraces each stub shaft, bearing at its left-hand end against the face of the reel and at its right-hand end against an abutment collar 16 which is held in properly adjusted position on the shaft by means of a set screw 17. By adjustment of the collars 16 along the shaft the springs 15 may be compressed more or less and thus their frictional contact with the reels may be varied. In this way an adjustable braking effect is provided to restrain the reels from turning too freely.

A stub shaft 18 (Fig. 1) projecting from the middle rail carries a guide roll beneath which pass the paper ribbons P' and P$^2$ from the reels which are mounted on the stub shafts 10 and 10$^a$. Another stub shaft 19 projecting from the rail 2 carries a guide roll beneath which passes the ribbon of metal foil F' from the reel mounted on the stub shaft 10$^b$. Similarly a guide roll carried by a stub shaft 20 supported by the rail 2 guides the two paper strips P$^3$ and P$^4$ from the reels mounted on the stub shafts 11$^a$ and 11$^b$, respectively—a secondary guide roll 21 carried by the rail 2 further assisting in guiding these latter strips.

The vertical frame member 5 supports four fixed, parallel, horizontal guide rods 22, 23, 24 and 25 (Fig. 17) which are smoothly polished and constitute guiding means for the paper and foil. On these rods, and abutting the member 5, are mounted fixed sleeves 22$^a$, 23$^a$, 24$^a$, 25$^a$, respectively. The sleeves 22$^a$ and 24$^a$ are of equal length and their outer end faces are designed to engage one edge of the paper strips P$^1$ and P$^2$; and P$^3$ and P$^4$ respectively. The sleeve 23$^a$ is shorter than sleeve 22$^a$ and designed to engage one edge of the foil F$^1$. Sleeve 25$^a$ is longer than sleeve 24$^a$ and is designed to engage one edge of foil F$^2$. By this arrangement the edges of the several paper strips are caused to register while the foils are offset, in opposite directions, that is to say, the margin of one foil projects beyond one edge of the paper strip while the opposite margin of the other foil projects beyond the opposite edge of the paper strip. This arrangement is designed for use in winding non-inductive coils but if it be desired to wind inductive coils then the sleeves 23$^a$ and 25$^a$ are replaced by sleeves of equal length and somewhat longer than the sleeves 22$^a$ and 24$^a$, thereby to space the margins of the two foils inwardly from the edges of the paper strips.

While smooth surfaced guide rods 22, 23, etc., are sufficient under ordinary conditions, it is contemplated that these rods may constitute stub shafts for the support of guide rolls properly contoured to align the paper and foil in the manner above described.

In a vertical plane forwardly of the guide rod 25 there is arranged the shaft 26 of an upper feed roll. This shaft turns in a fixed tubular bearing 27 projecting from the left-hand side of the frame member 5 and in a bearing in the part 9. Just to the right of part 9, the shaft carries a pinion 28 which meshes with a rack 29 whose lower end is pivotally connected at 30 (Fig. 3) to a long lever 33 whose rear end is mounted upon a stub shaft 34 fixed at its right-hand end in the frame member 5, the forward end 35 of the lever constituting a handle by means of which the lever may be moved downwardly, thereby to cause the rack 29 to rotate the pinion 28 and the feed roll shaft 26. The lever 33 has a hub member 33$^a$ (Fig. 2) which turns on the shaft 34, and a coiled spring 33$^b$ (Figs. 2 and 3) engages the lever and encircles the shaft 34 and is so arranged as to tend to raise the lever 33 and thus to move the rack 29 upwardly.

Figures 2, 18:
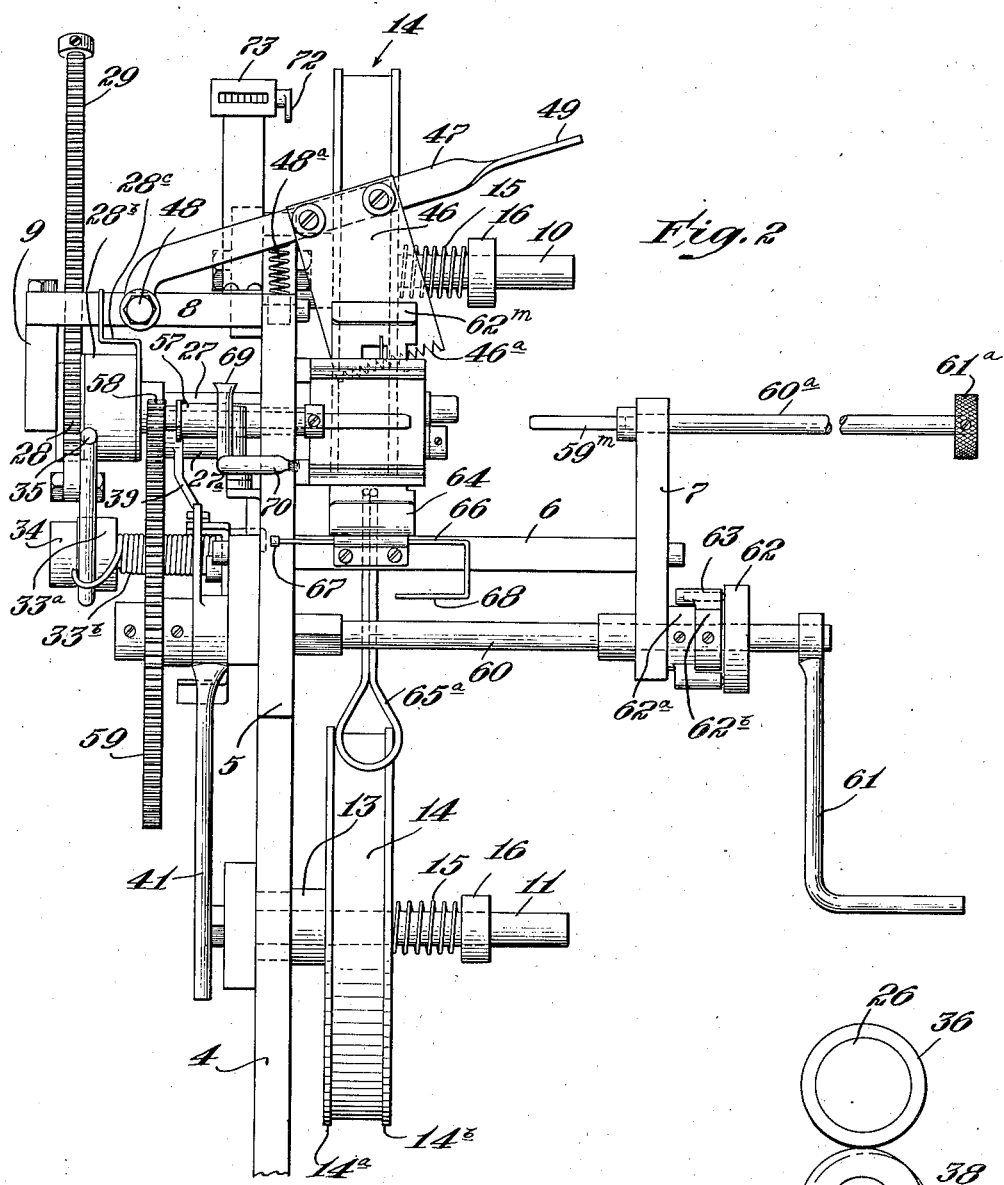
Fig. 2 is a front elevation of the apparatus shown in Fig. 1 with parts omitted.
Fig. 18 is a diagrammatic end elevation of the feed rolls.

Mounted on the shaft 26 to the right of the pinion 28 is a clutch spool 28$^b$ (Fig. 2). The pinion 28 has a hub which cooperates with the left-hand side of the clutch spool 28$^b$ to drive the spool positively as the pinion is turned by the downward movement of the rack 29. Interposed between the pinion hub and spool 28$^b$ is any suitable type of one-way drive (not shown) such for example as a pawl or ball clutch, the details of which need not be specifically illustrated as such devices are of common knowledge in the arts.

At its opposite side the clutch spool 28$^b$ cooperates with a retaining device loose on and coaxial with shaft 26 and held against rotation by a forked arm 28$^c$ engaging the bar 8. Interposed between the spool and retaining device is a pawl or ball clutch of conventional type so designed as to prevent reverse movement of the spool 28$^b$ and shaft 26, while the rack 29 is being raised. The shaft 26 is thus constrained always to move in the same direction, such direction being that which is effective to feed the paper and foil to the winding mechanism. By this arrangement, a full throw of lever arm 35 necessarily turns the upper feed roll through a predetermined angle and thus advances an accurately measured length of paper.

The shaft 26 has fixed to it the upper feed roll 36 which cooperates with the lower feed roll 37.

This lower feed roll (Fig. 16) is mounted to turn freely on the eccentric end portion of a shaft 38 turning in a fixed tubular bearing member 27ª parallel to bearing 27 and carried by the frame part 5. The shaft 38 is provided with a downwardly directed arm 39 (Fig. 13) connected by a link 40 to an actuating lever having an arm 41 which constitutes a handle whereby the shaft 38 may be rocked thus bodily moving the roll 37 toward or from the roll 36. Preferably the surface of the roll 36 is covered with rubber or other friction material.

Figure 4:
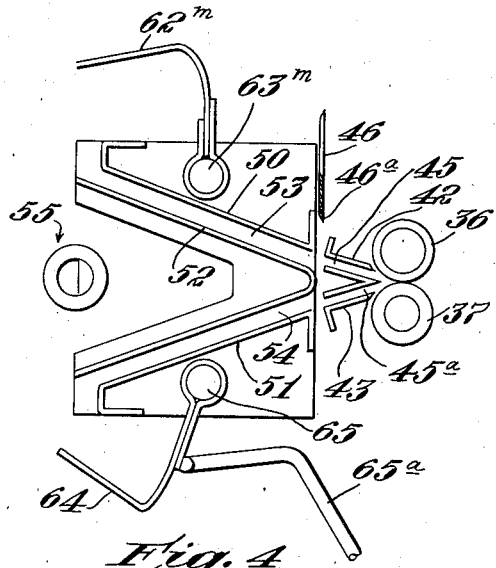
Fig. 4 is a fragmentary enlarged right-hand side elevation of the forward portion of the apparatus at which the winding means is located.

Forwardly of the feed rolls 36 and 37 there are arranged rigid guide members 42, 43 and 44 (Fig. 4) which define forwardly divergent inclined guide channels 45 and 45ª. Forwardly of the guide members 42, 43 and 44 there is arranged a cutting blade 46 having a cutting edge 46ª. This blade is mounted on a lever 47 pivoted at 48 (Fig. 2) on the frame bar 8. A spring 48ª tends to lift the lever 47 and thus to move the cutting blade 46 out of the cutting position. The righthand end of the lever 47 forms a handle 49 (Fig. 2) by means of which the cutter may be manipulated.

Forwardly of the blade 46, fixed guides 50, 51 and 52 define forwardly divergent guide channels 53 and 54 forming extensions of the channels 45 and 45ª respectively. These guide members are rigid and are mounted upon the frame member 5.

In a vertical plane forward of the guide channels 53 and 45 and in a horizontal plane substantially midway between the forward ends of these channels there is arranged the winding mandrel 55. This mandrel (Figs. 14 and 15) comprises a part 56 which turns in a fixed tubular bearing 57 supported by the member 5. The mandrel shaft is provided at its left-hand end with a pinion 58 which meshes with a gear 59 mounted on a shaft 60 (Fig. 2) which turns in bearings in the plate 5 and in the plate 7. As illustrated the ratio of the pinion and gear is twelve to one. At its right-hand end this shaft 60 is furnished with a crank 61, by means of which the shaft may be turned. Preferably the shaft is furnished with a disk 62 (Fig. 2) having a depression in its left-hand face designed to be engaged alternatively by either of two spring-actuated clicks carried by independently adjustable collars 62ª and 62ᵇ mounted on a fixed sleeve concentric with shaft 60. At each revolution of the shaft 60 the clicks 63 drop alternately into the depression in the disk 62 causing a slight noise and resistance to turning and by counting the number of clicks the operator may determine how many turns or half turns the shaft has been rotated and thus may determine the number of turns of the coil being wound.

The right-hand end portion 56ª (Fig. 14) of the mandrel is unsupported and is slabbed off to provide the substantially flat diametrical surface 56ᵇ of Fig. 15. At the inner end of this flat surface the mandrel carries a fixed collar 57ª and the flattening of the mandrel provides a substantially semi-circular pocket 58ˣ within the collar.

The mandrel comprises a second member 59ᵐ (Fig. 14) which is likewise slabbed off to provide a diametrical flat surface complemental to the surface 56ᵇ and designed to be disposed parallel to the surface 56ᵇ although with sufficient spacing between the flat surfaces of the two mandrel members to admit between them the requisite number of sheets of paper and foil. The part 59ᵐ of the mandrel is fixed to or integral with a spindle 60ª turning freely in a bearing in the upper part of the member 7, the spindle 60ª being furnished at its right-hand end with a knurled disk or wheel 61ª by means of which it may be manipulated, the spindle 60ª being free to slide in its bearing as well as to turn therein. The axial movement of the spindle 60ª is sufficient to permit separation of the ends of the two mandrel parts to permit removal of a completed coil therefrom.

Above the upper fixed guide member 50 there is arranged a swinging hook-like retainer member 62ᵐ pivotally supported at 63ᵐ, upon a stub shaft projecting from part 5, while a similar hooked retainer 64 is pivoted at 65 upon a stub shaft, projecting from part 5, at a point below the lower guide member 51. Since the retainer member 64 is somewhat inaccessible, it is preferred to provide it with an actuating handle 65ª (Figs. 1 and 2).

A shaft 66 (Fig. 2) is mounted to turn and to slide in a suitable bearing carried by the bar 6 of the frame, the shaft 66 having a manipulating disk 67 at one end while its opposite end is hook-shaped, having a portion 68 which is spaced from but parallel to the main part 66 of the shaft.

Mounted on the frame member 5 is a reservoir 69 for the reception of adhesive, the reservoir having a horizontal delivery portion 70 located conveniently for removal of adhesive by the operator for application to the outer wrapper of paper, and on a post carried by part 5 is a counter mechanism 73 of conventional type having an actuating lever 72.

Figure 5:
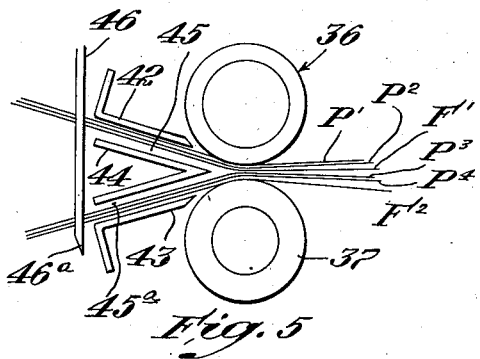
Fig. 5 is a diagrammatic view illustrating the position of the feed rolls and the cutting knife at the instant at which the material is severed at the completion of winding.

The operation of the machine is substantially as follows:

If it be assumed that the reels 14 are supplied with paper and foil and that the machine is to be started for the first time, the strips of paper and foil are first drawn off from the reels and passed beneath guide rolls on the stub shafts 18, 19, 20 and 21 and then over the guides 22, 23, 24 and 25, respectively. The operator then manipulates the handle 41 so as to separate the feed rolls 36 and 37 and pulls the several strips of material between the rolls and to a point forwardly of the plane of the blade 46. The operator then moves the handle 41 forwardly to close the rolls and actuates the lever 49 so as to cause the blade 46 to sever all of the strips as shown in Fig. 5 thus providing ends which are in the same vertical plane.

Figure 6:
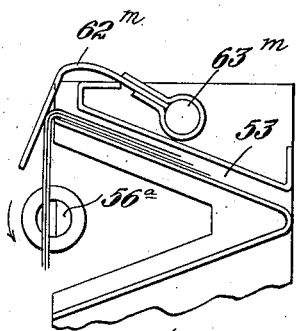
Fig. 6 is a fragmentary diagrammatic transverse section to enlarged scale through one of the elements of the winding mandrel illustrating the step of associating one strip of metal foil and its accompanying paper wrapping with the mandrel.
Figure 7:
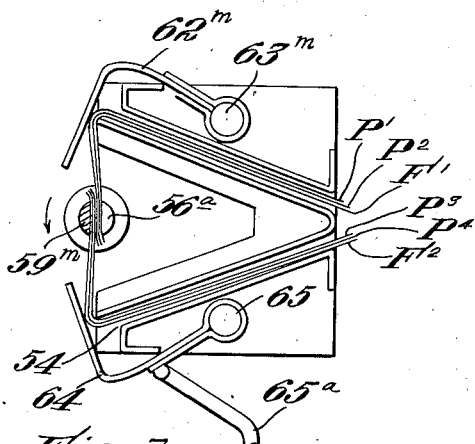
Fig. 7 is a similar view showing the other strip of metal foil associated with the mandrel.

The blade-actuating handle 49 is released so that the blade rises and with the feed rolls still closed the operator depresses the handle 35 thus causing the rack 29 to descend and to rotate the upper feed roll 36. Since the feed rolls are now close together all of the several strips of paper and foil will be fed forwardly, the operator guiding them during this threading up operation into the guide passages 53 and 54. The strips are fed forward sufficiently to provide ends which may be grasped at the forward ends of the passages 53 and 54. The operator then seizes the forwardly projecting ends of the paper strips P' and P² and the foil F' and turns them down (Fig. 6) into contact with the flat surface 56ᵇ of the mandrel member $56^a$. She then turns the retainer member $62^m$ downwardly so that it engages the strips (Fig. 6) just at the forward end of channel 53 and temporarily holds them against the mandrel member $56^a$. The operator then likewise turns the forward end portions of the paper strips $P^3$ and $P^4$ and the foil $F^2$ upwardly (Fig. 7) so as to overlap the down-turned ends of the other strips and by actuation of the handle $65^a$ turns the retainer 64 upwardly so as temporarily to engage the strips just beyond the forward end of channel 54. The operator then seizes the handle $61^a$ and moves the mandrel member $59^m$ inwardly into association with the mandrel member $56^a$ so as to clamp the several strips of paper and foil between the flat surfaces of the mandrel members as illustrated in Fig. 7, the left-hand end of mandrel part $59^m$ seating in the pocket $58^x$ in collar 57.

Figure 9:
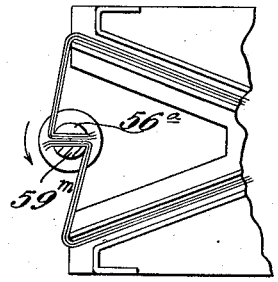
Fig. 9 is a view generally similar to Fig. 7 but showing the mandrel after it has made the first quarter turn in the winding operation.
Figures 10, 11:
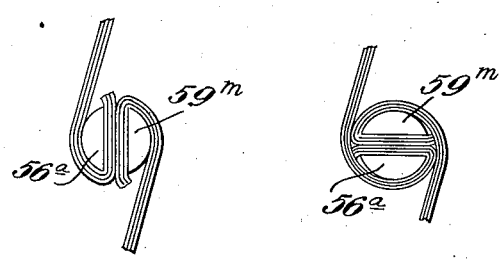
Figs. 10 and 11 are views similar to Fig. 9 showing the mandrel as having turned a quarter turn and a half turn respectively beyond the position of Fig. 9.

The retainer members $62^m$ and 64 are now restored to their initial inoperative position, the handle 41 is moved to the rearward position indicated in broken lines in Fig. 3 thereby separating the feed rolls (Fig. 8), and the operator turns the crank 61 thus rotating the mandrel in a counterclockwise direction. This results in wrapping the paper and foil about the mandrel elements as indicated diagrammatically in Figs. 9, 10 and 11. During this operation the operator counts the clicks made by the detents 63 and when the shaft 60 has been turned the predetermined number of times requisite to make a coil of the desired number of turns, the operator stops the winding operation and pushes the handle 41 forwardly to a substantially vertical position, as shown in Fig. 3. In this position the rolls are closed (Fig. 12) just sufficiently to cause the upper roll to bear frictionally upon the upper strip P' of paper but without sufficient pressure to cause the other strips to feed. The operator now depresses the handle 35 thus causing the upper feed roll to turn and thus feed forward a portion of the single paper strip P', thus providing a loose forwardly projecting loop of this strip. The operator now turns the member 68 upwardly and thrusts its free end into this loop of the paper P' (Fig. 19) and then again closes the rolls 36 and 37 so as to grip the several strips firmly and manipulates the blade 46 so as to cut all of the strips at the same time, again as shown in Fig. 5.

The operator now withdraws the loop-retaining member 68 from the loop of outer paper strip, separates the feed rolls, and turns the crank 61 a part turn or more sufficient to wind the ends of the several strips onto the coil and to wrap the surplus material of the outer strip P' about the foil so as completely to cover the ends of the foil. Since the distances from the tangent points (where the two strips of foil contact the wound coil) to the respective cutting points are substantially equal due to the position of the guideways 53 and 54, the ends of the two strips of foil are disposed at points substantially 180° apart circumferentially of the coil.

The operator now applies adhesive from the supply 70 to the inner surface of the end portion of the paper strip P' and sticks this end down to the underlying paper. She then withdraws the member $59^m$ of the mandrel by manipulation of the handle $61^a$ and pulls the completed coil from off the member $56^a$ of the mandrel. The parts are now in readiness for a repetition of the cycle of operations, it being noted that it is not necessary at the commencement of a succeeding operation to actuate the cutter 46 as in the initial threading up of a machine, it being merely requisite to depress the handle 35 thereby to actuate the feed rolls to feed the strips forwardly through the channels 45 and $45^a$ and 53 and 54 so as to present the ends of the strips for application to the mandrel.

At each actuation of the cutter the operator, with her finger, may manipulate the actuating lever 72 of the counter mechanism 73 thus providing a record of the number of completed coils which are wound. If the coil is of the non-inductive type the operator bends the projecting edges of the metal foil downwardly and inwardly over the ends of the convolutions after the coil has been withdrawn from the mandrel. If the coil is of inductive type the edges of the foil are not exposed and no further manipulation is necessary.

While one desirable embodiment of the invention has been disclosed by way of example, it is to be understood that the invention is not necessarily limited to this precise embodiment but is to be regarded as broadly inclusive of any and all equivalent constructions falling within the scope of the appended claims.

I claim:

1. Method of winding capacitors which comprises as steps the drawing from suitable supplies and the winding simultaneous thereto of a plurality of strips of paper and a plurality of strips of metal foil so that the convolutions of metal foil are always separated by convolutions of paper, the continued winding of the strips until the requisite lengths of metal foil have been wound, temporarily discontinuing the winding, the drawing from the supply of an additional length of the outermost paper strip to form an end portion loop, the severing of all strips at points between said loop and the supply, the winding of the terminal portions of the several strips onto the coil so that said end portion of the outer paper strip overlaps the ends of the several strips of metal foil, and adhesively fastening the overlapping end portion of the outer paper strip to the underlying convolutions.

2. Method of winding capacitors which comprises as steps providing supplies of paper and metal foil ribbon, disposing the ends of two metal foil ribbons and at least two paper ribbons in registry with one paper strip interposed between two metal foil ribbons, advancing the end of one paper strip and one foil ribbon along a predetermined path while advancing the end of the other paper strip and the other metal foil ribbon along a divergent path, overlapping the end portions of one foil and paper strip and the end portions of the other foil and paper strip but with the advancing ends of the two pairs oppositely directed, rotating said overlapped end portions about an axis intervening between the overlapped ends and extending transversely of the lengths of the ribbon thereby to form a wound coil in which the convolutions of foil are separated by convolutions of paper, temporarily stopping the winding, drawing from the supply an added length of the outermost paper strip to form an end portion loop between coil and supply, cutting transversely through the several strips at points between the loop and the supply, resuming the winding to bring the terminal portions of the strips onto the coil, and applying adhesive to the inner surface of the terminal portion of the outer paper strip before completing the winding of the latter.

ERNST A. NORDBERG.

REFERENCES CITED

The following references are of record in the file of this patent:

UNITED STATES PATENTS

| Number | Name | Date |
|---|---|---|
| 1,886,063 | Sprague | Nov. 1, 1932 |
| 1,940,847 | Danziger | Dec. 26, 1933 |
| 1,608,179 | Marchand | Nov. 23, 1926 |
| 1,931,009 | Phelps et al. | Oct. 17, 1933 |
| 1,346,700 | Carlsen | July 13, 1920 |
| 1,325,551 | Wood et al. | Dec. 23, 1919 |
| 1,809,147 | Rowe | June 9, 1931 |
| 1,862,727 | Thordarson | June 14, 1932 |
| 317,050 | Walker et al. | May 5, 1885 |
| 2,205,171 | Kile, et al. | June 18, 1940 |
| 1,881,170 | Butler | Oct. 14, 1932 |
| 2,001,347 | Holmes | May 14, 1935 |
| 2,358,654 | Nordberg | Sept. 19, 1944 |
| 1,337,837 | Gore | Apr. 20, 1920 |

FOREIGN PATENTS

| Number | Country | Date |
|---|---|---|
| 648,554 | German | Aug. 3, 1937 |